Feb. 16, 1943.   R. E. GOULD   2,311,224
REFRIGERATING APPARATUS
Filed March 24, 1941   2 Sheets-Sheet 1
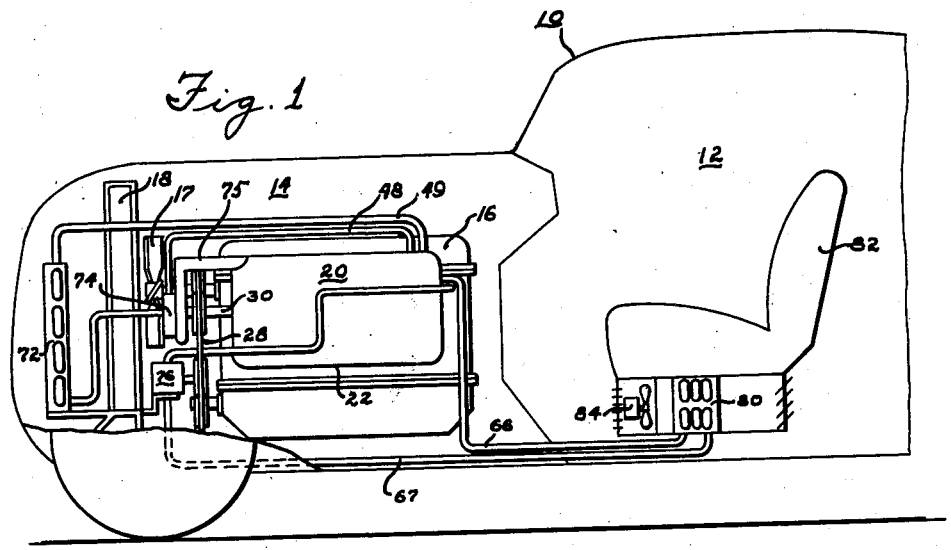
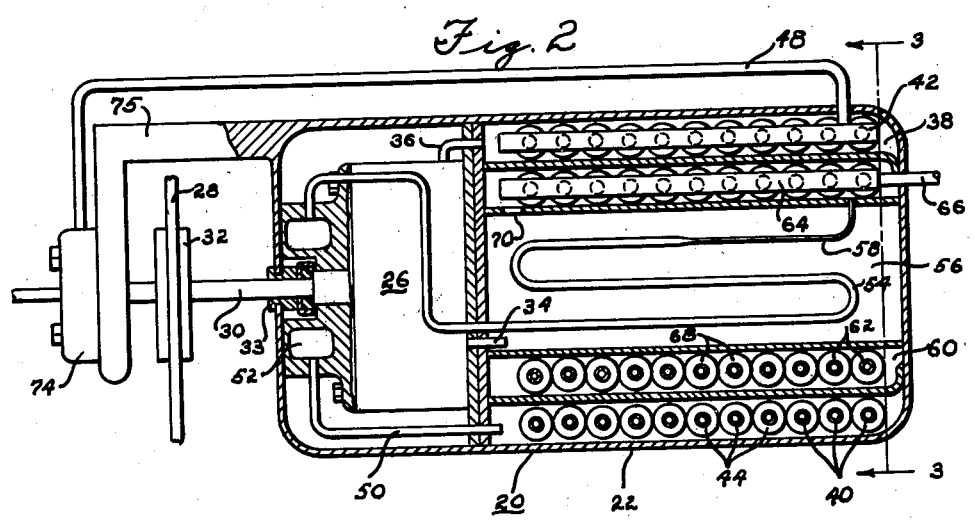
INVENTOR.
Richard E. Gould
BY Spencer, Hardman & Fehr Feb. 16, 1943.  R. E. GOULD  2,311,224
REFRIGERATING APPARATUS
Filed March 24, 1941   2 Sheets-Sheet 2
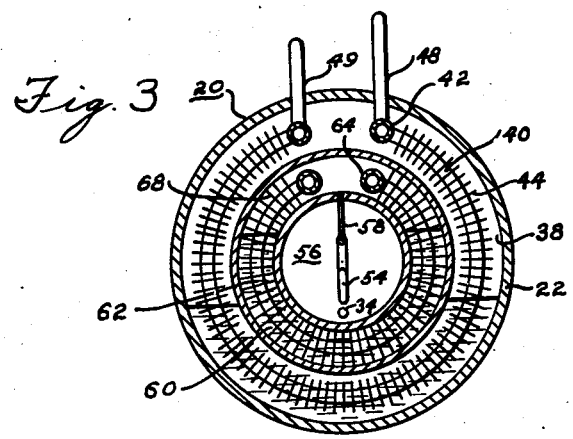
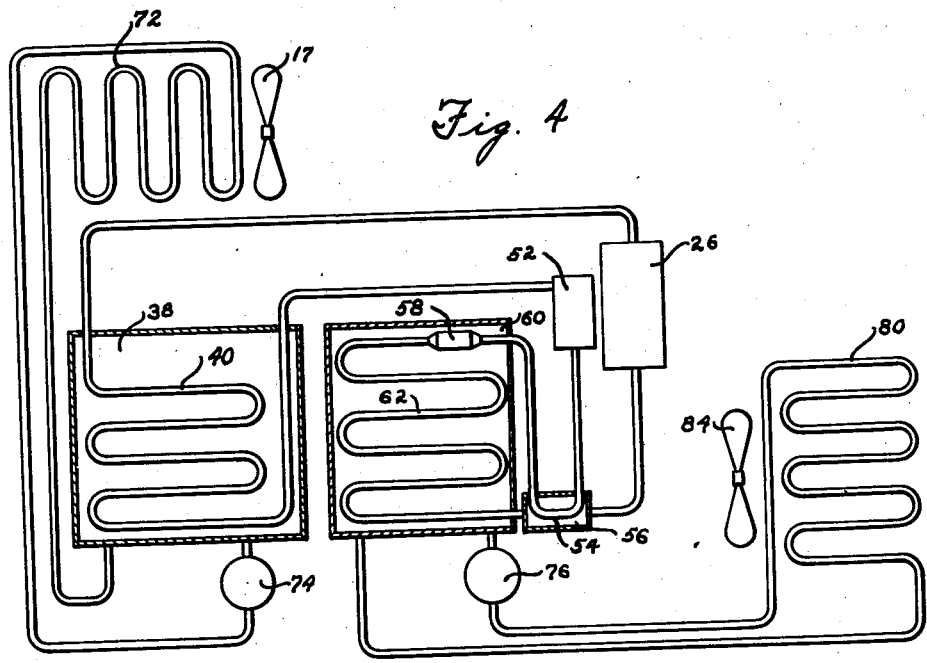
INVENTOR.
Richard E. Gould
BY Spencer, Hardman & Fehr Patented Feb. 16, 1943

2,311,224

UNITED STATES PATENT OFFICE 2,311,224

REFRIGERATING APPARATUS

Richard E. Gould, Oakwood, Ohio, assignor to General Motors Corporation, Dayton, Ohio, a corporation of Delaware Application March 24, 1941, Serial No. 384,817

5 Claims. (Cl. 62—117)

This invention relates to refrigerating apparatus and more particularly to a hermetically sealed self-contained volatile refrigerant system for use in conditioning the air of an automobile.

It is an object of my invention to provide an air conditioning system in which the air is cooled by means of a mechanical refrigerating system which is completely enclosed within a single casing.

Another object of this invention is to provide an air conditioning system which may be installed in an automobile by an ordinary automobile mechanic.

A further object of this invention is to provide a compact and durable volatile refrigerant system suitable for use in conditioning the air in a vehicle.

Another object of this invention is to provide a mechanical refrigerating system of the type which does not require the use of long or exposed refrigerant lines.

Further objects and advantages of the present invention will be apparent from the following description, reference being had to the accompanying drawings, wherein a preferred form of the present invention is clearly shown.

In the drawings:

Fig. 1 is a view showing the system applied to an automobile;

Fig. 2 is a view partly in section showing the internal arrangement of the volatile refrigerant unit;

Fig. 3 is a sectional view taken on the line 3—3 of Fig. 2; and

Fig. 4 is a diagrammatic view of the various flow circuits.

Even though air conditioning apparatus has been in common use for many years and even though many patents have been granted on systems designed for use in automobiles, very few automobiles have been provided with volatile refrigerant air conditioning apparatus. One of the reasons for this is that the ordinary garage mechanic is not equipped to install and service the prior art type of mechanical refrigerating systems. Another reason is that the cost of installing a refrigerant system of the type in which refrigerant lines must be strung from one part of the car to another has been prohibitive. In order to overcome these problems, the entire volatile refrigerant system is confined within a single sealed casing and is adapted to be fully assembled at the factory.

In the drawings, in which I have shown a preferred embodiment of my invention, reference numeral 10 designates a conventional automobile having a passenger compartment 12 and an engine compartment 14. Reference numeral 16 is intended to designate a conventional automobile engine provided with the usual radiator fan 17 and engine cooling radiator 18. In order to condition the air for the passenger compartment 12, I have provided a novel volatile refrigerant unit 20 which is adapted to be mounted in any convenient location on the automobile such as in the engine compartment, as shown, or in the trunk compartment. The unit 20 comprises an outer casing 22 which may be made in any well-known manner, such as by welding sections of casing together.

The entire volatile refrigerant system is mounted within the casing 22 and comprises a conventional rotary compressor 26 which is adapted to be driven from the main engine 16 through the fan belt 28 and the shaft 30 on which is mounted a pulley 32 adapted to be driven by the belt 28 as will be explained more fully hereinafter. In order to prevent the escape of refrigerant from the compressor along the shaft 30, I have provided a conventional shaft seal 33. The compressor 26 is provided with a suction inlet 34 and an outlet 36. The compressed refrigerant discharged by the compressor flows into a condensing chamber 38 in which is mounted a plurality of semicircular water pipes 40 which are adapted to be supplied with cooling water through the header 42. The water pipes 40 are provided with fins 44 which serve to increase the condensing surface. Water is supplied to the header 42 through the line 48, in a manner to be explained more fully hereinafter. The refrigerant which condenses within the chamber 38 leaves through liquid refrigerant lines 50 which convey the liquid refrigerant to the shaft seal cooling cavity 52 wherein the liquid refrigerant serves to absorb the heat generated by the shaft seal as well as the main compressor bearing. Under certain circumstances, a portion of the liquid refrigerant may be vaporized in the shaft seal cooling cavity 52. In order to recondense the refrigerant vaporized in the cavity 52 the refrigerant leaving the cavity 52 is caused to circulate through a coil 54 located within the vapor chamber 56 which serves as a heat interchange chamber as will be explained more fully hereinafter.

A fixed restrictor 58, preferably of the capillary tube type, controls the flow of liquid refrigerant to the evaporator chamber 60 in which is located a plurality of semicircular water pipes 62. The pipes 62 are supplied with water to be cooled through the header 64 which, in turn, is supplied with water from the air cooling coil 80 through the line 66. Heat radiating fins such as 68 are provided on the water pipes 62 for increasing the heat transfer surface between the water to be cooled and the vaporizing refrigerant. The refrigerant which is vaporized in the chamber 60 leaves the chamber through the passage 70 leading to the heat interchange chamber 56. The relatively cold refrigerant vapor entering the chamber 56 serves to cool and, if necessary, condense the refrigerant flowing through the coil 54. The refrigerant vapor is withdrawn from the chamber 56 by the compressor 26 via the compressor suction line 34.

Thus, it is apparent that the entire volatile refrigerant system is completely enclosed within the casing sections 22 and 24. The condensing water is supplied to the water pipes 40 through the inlet 48 and leaves through the outlet 49 which conveys the heated water to the heat dissipating coil 72 located in front of the main engine radiator 18. By virtue of this arrangement, the air circulated over the main radiator 18 serves to cool the water flowing through the heat dissipating coil 72. The condenser cooling water is withdrawn from the heat dissipating unit 72 by a pump 74 which discharges into the line 48 leading to the condensing pipes 40. The pump 74 is carried by a bracket 75 secured to the unit 20 and is adapted to be driven by the shaft 30. While I have not shown any flexible joints in the shaft 30, it is obvious that flexible joints may be provided, if desired. A second pump 76 which is also adapted to be driven by the main fan belt 28 is provided for circulating a second stream of water through the water chilling pipes 62 located in the evaporator chamber 60 and the air cooling coil 80. The chilled water flows from the pipes 62 through the line 66 and air cooling coil 80 which may be located in any convenient place in the passenger compartment such as under the driver's seat 82 as shown in Fig. 1. The air to be conditioned is circulated over the coil 80 by means of the blower unit 84. The water leaving the coil 80 returns to the water chiller through the line 69 in which the pump 76 is located.

By virtue of the above described arrangement, the air conditioning apparatus may be installed by any garage mechanic since there are no volatile refrigerant connections to be made. The water lines may be made of any ordinary inexpensive material now commonly used for conveying water from one point to another. The air cooling coil 80 may be a special coil provided for that purpose or it may be a coil of the type now provided in automobiles for heating the air during the winter. These coils may be of very light construction since they are not required to retain high pressure refrigerant. This arrangement not only provides a unit which is simple to install but also has the advantage that the complete volatile refrigerant system may be assembled, cleaned and charged with the proper amount and quality of refrigerant and oil at the factory. Furthermore, the danger of refrigerant lines becoming broken during use has been eliminated. This not only avoids the inconvenience necessitated by the breakage of the refrigerant lines but also prevents the main compressor bearings from being damaged due to the loss of the lubricant and refrigerant. The problem of mounting the volatile refrigerant system is no different than the problem of mounting an ordinary car generator.

It is apparent, therefore, that applicant's system is not only compact but also simple to install and foolproof in operation.

While the form of embodiment of the invention as herein disclosed, constitutes a preferred form, it is to be understood that other forms might be adopted, all coming within the scope of the claims which follow.

What is claimed is as follows:

1. In combination, a casing, a compressor within said casing, a condenser within said casing, an evaporator within said casing, refrigerant flow connections between said compressor, condenser and evaporator, a shaft seal for said compressor, and a shaft seal cooling cavity, said refrigerant flow connections comprising means for circulating liquid refrigerant from said condenser through said shaft seal cooling cavity and thereafter in thermal exchange with refrigerant vapor leaving said evaporator.

2. In combination with a vehicle having a passenger compartment, a casing, a compressor within said casing, a condenser within said casing, an evaporator within said casing, refrigerant flow connections between said compressor, condenser and evaporator, a shaft seal for said compressor, a shaft seal cooling cavity, said refrigerant flow connections comprising means for circulating liquid refrigerant from said condenser through said shaft seal cooling cavity and thereafter in thermal exchange with refrigerant vapor leaving said evaporator, and means for producing a thermal exchange between said evaporator and the air within said passenger compartment.

3. In combination with a vehicle having an engine compartment and a passenger compartment, a casing within said engine compartment, a compressor within said casing, a condenser within said casing, an evaporator within said casing, refrigerant flow connections between said compressor, condenser and evaporator, a shaft seal for said compressor, a shaft seal cooling cavity, said refrigerant flow connections comprising means for circulating liquid refrigerant from said condenser through said shaft seal cooling cavity and thereafter in thermal exchange with refrigerant vapor leaving said evaporator, and means for producing a thermal exchange between said evaporator and the air within said passenger compartment.

4. In combination with a vehicle having a passenger compartment and an engine compartment, an engine within said engine compartment for propelling said vehicle, a casing, a compressor within said casing, means for supplying power from said engine to said compressor, a condenser within said casing, an evaporator within said casing, refrigerant flow connections between said compressor, condenser and evaporator, a shaft seal for said compressor, a shaft seal cooling cavity, said refrigerant flow connections comprising means for circulating liquid refrigerant from said condenser through said shaft seal cooling cavity and thereafter in thermal exchange with refrigerant vapor leaving said evaporator, and means for producing a thermal exchange between said evaporator and the air within said passenger compartment.

5. In combination, a casing, a compressor within said casing, a condenser, an evaporator, refrigerant flow connections between said compressor, condenser and evaporator, a shaft seal for said compressor, and a shaft seal cooling cavity, said refrigerant flow connections comprising means for circulating liquid refrigerant from said condenser through said shaft seal cooling cavity and thereafter in thermal exchange with refrigerant vapor leaving said evaporator.

RICHARD E. GOULD.